Jan. 2, 1940.  R. V. KLEINSCHMIDT  2,185,595
DISTILLATION METHOD AND APPARATUS
Filed Dec. 9, 1936  3 Sheets-Sheet 1
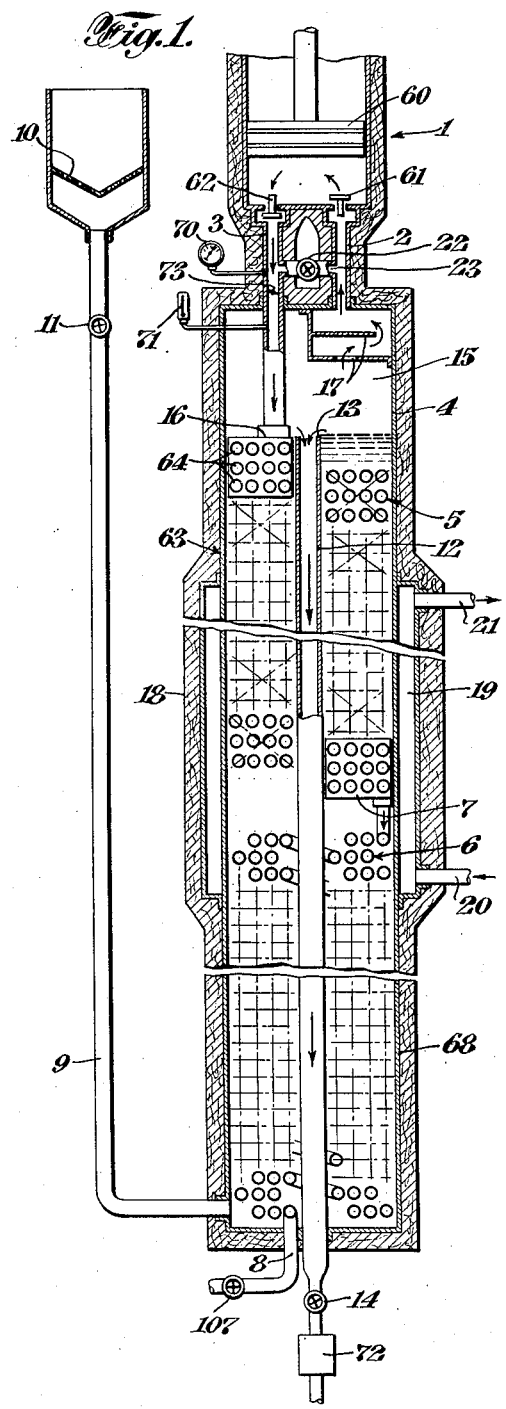
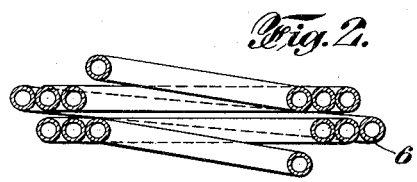
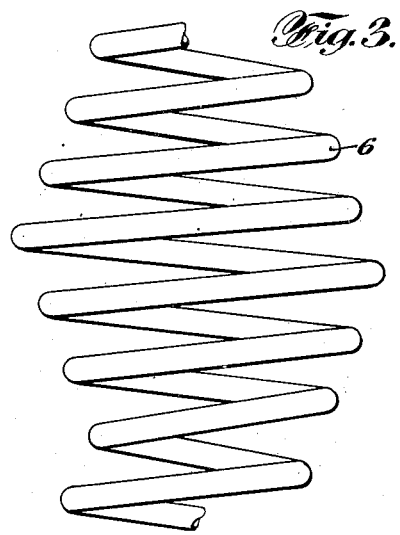
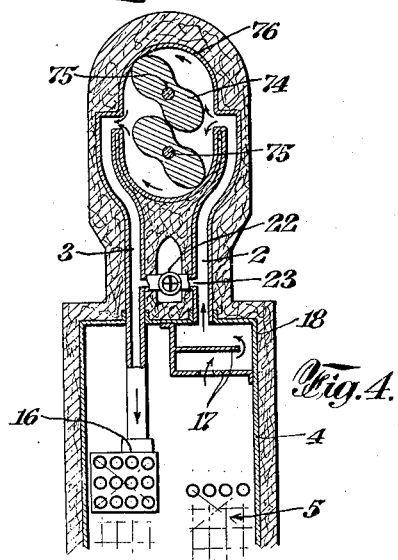
INVENTOR
Robert V. Kleinschmidt
BY Kenyon & Kenyon
ATTORNEYS

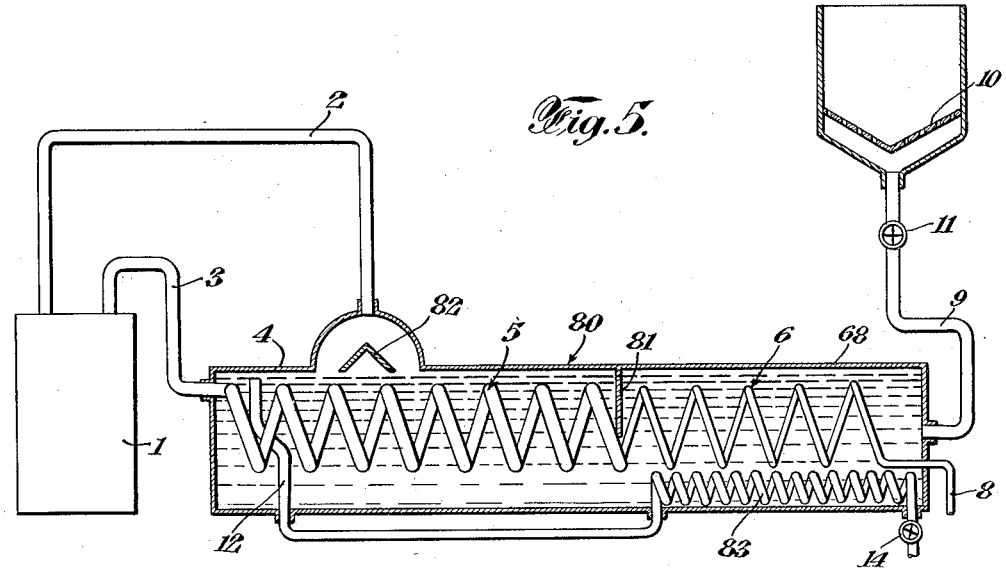
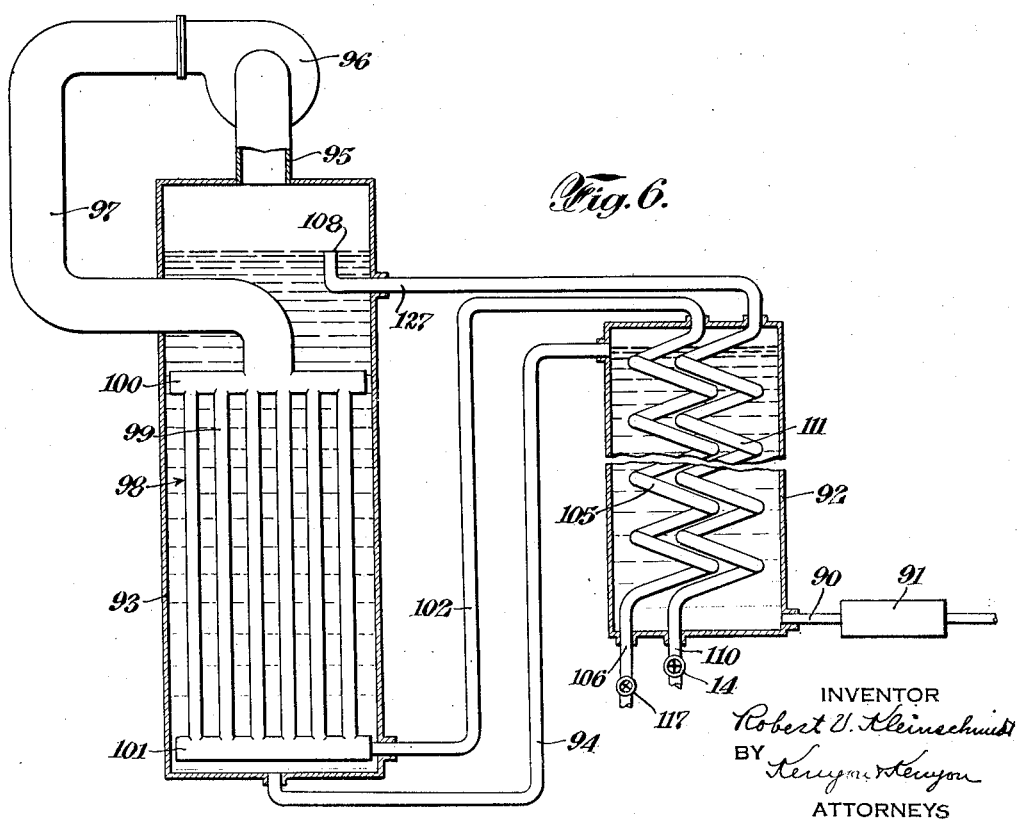

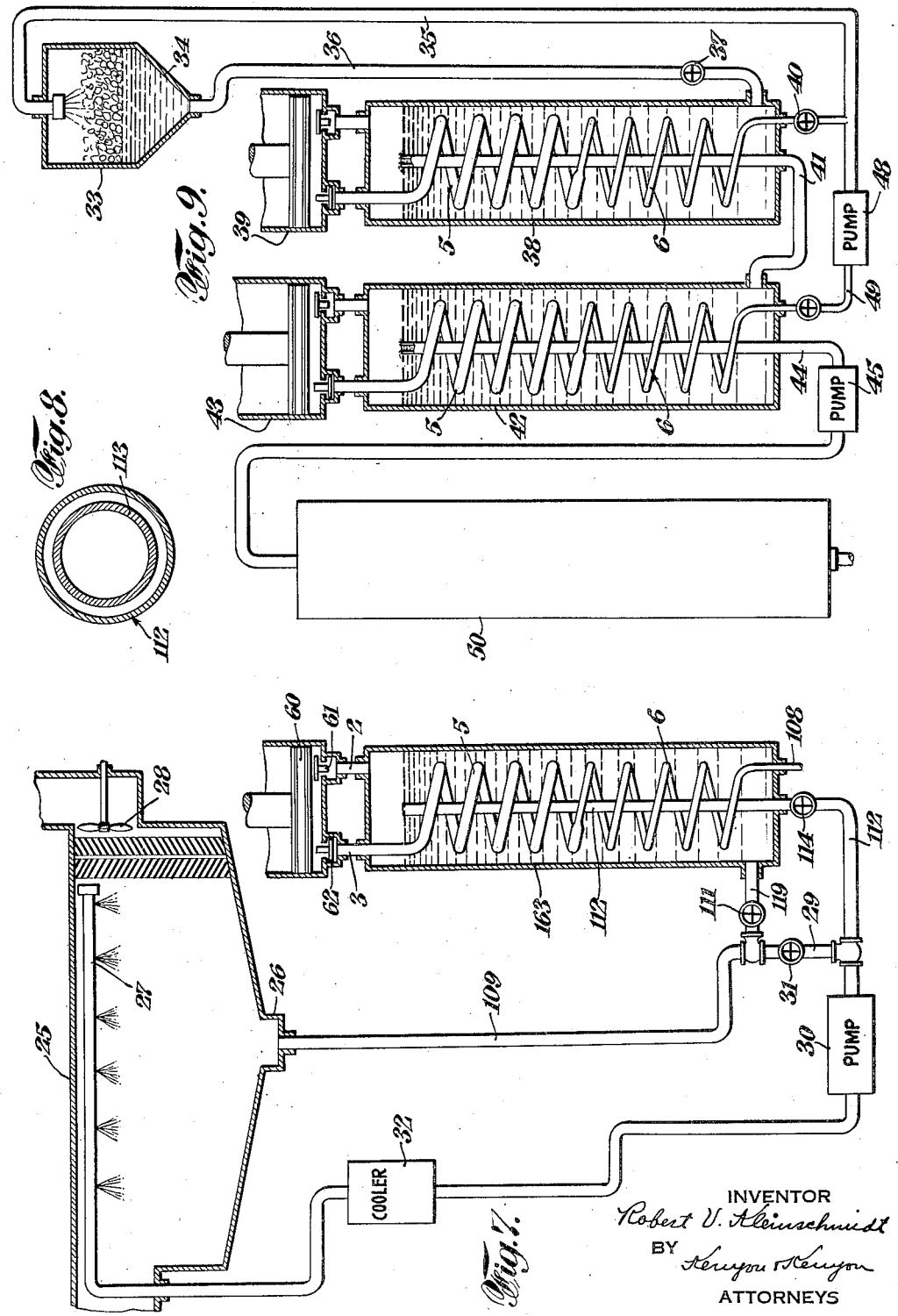

Patented Jan. 2, 1940

2,185,595

UNITED STATES PATENT OFFICE 2,185,595

DISTILLATION METHOD AND APPARATUS

Robert V. Kleinschmidt, Stoneham, Mass., assignor to Arthur D. Little, Incorporated, Cambridge, Mass., a corporation of Massachusetts Application December 9, 1936, Serial No. 114,889

22 Claims. (Cl. 202—75)

This invention relates to improvements in process and apparatus for separating components of a fluid mixture of two or more substances by reason of their difference in boiling point or volatility. More particularly, my process and apparatus is applicable to those cases where both the initial mixture and the separated components are liquids during some portion of the process, but these liquids may be more or less concentrated solutions of solids, liquids, or gases in liquids, or liquid mixtures of materials normally in the solid or gaseous form in the pure state. My process and apparatus relate generally to what is commonly referred to as distillation, fractionation, rectification, evaporation, concentration and the like, which are characterized by the evaporation of a portion of a liquid mixture. Any such liquid mixture is referred to herein as a "solution" for purposes of brevity.

One object of my invention is to provide a process and apparatus which are more economical in the use of energy than processes and apparatus now used for distillation and which can utilize mechanical or electrical power with high efficiency.

A further object is to permit elimination of all external sources of heat such as steam, gas, or coal, during the normal operation of the process.

A further object is to permit elimination of the use of cooling means such as cooling or condensing water, fans, etc.

A further object is to provide a compact self-contained and readily portable unit which can be operated merely by connection to a source of mechanical or electrical power and which has a large throughput for its space and weight.

A further object is to permit delivery of one or more of the final products at a temperature which is not very much greater than and is preferably approximately the same as that of the fluid entering the process, which may be at, above, or below the surrounding temperature. Moreover, in practice the temperature of discharged fluid preferably bears a definite predetermined relation to the temperature of the entering fluid.

A further object is to provide an apparatus having a minimum of variables requiring independent operating control.

A further object is to provide an apparatus which does not contaminate the distillate by accidental leakage within the apparatus.

I have discovered that these and other desirable objectives can be accomplished by my process and apparatus wherein there is cyclical utilization of heat in a novel manner. By use of proper thermodynamic relations, and by utilizing so far as possible all the available heat units in the system to the desired end, I am able to carry out the process of this invention with the application to the system of only a small fraction of the external energy that is customary in conventional distillation processes, such as those involving even the best distillation methods which are now employed for this purpose. It is well known that the theoretical energy required to separate, for example, pure water from a dilute salt solution, such as sea water, is very small. Up to the present time, however, no satisfactory means has been devised for applying this energy except in the form of heat, and it has been customary to supply this heat in the form of latent heat, this latent heat being later largely or wholly discarded into cold water in a condenser. In order to increase the effectiveness of this large amount of heat, it has been customary to use cascaded or multiple effect evaporators in which the vapor from one still is supplied to the heating coils of the next at a lower pressure. Such arrangements are, however, only a partial solution to the problem, since it is seldom economical to use more than four such "effects", the latent heat from the last effect being thrown away in the cooling water of a condenser. Moreover, such devices are expensive and require essentially a complete still for each effect, and, moreover, the various effects operate under various conditions of pressure or vacuum, in some cases using pressures of the order of 150 lbs. per square inch or more. Such varying pressures and the resulting variation of temperature from one effect to the next is often undesirable, especially when materials sensitive to heat are being evaporated—milk, for example—or when, as in the case of sea water, temperatures above 230° F. tend to cause a hard scale to form on the heating surface.

The present process is based on the discovery of a means of utilizing energy in the form of mechanical work to cause a small quantity of latent heat to be recirculated or cycled indefinitely within the apparatus, without purposely removing any of this latent heat. It is a feature of this invention that the energy in the form of mechanical work is utilized to raise the pressure on the vapor sufficiently to raise its condensing temperature above the boiling point of the impure solution from which vapor is evolved and that no other source of energy is required in the normal practice of the distillation operation. This energy carried by the vapor is then utilized by permitting it to condense in out-of-contact heat exchange with impure solution. Moreover, the sensible heat in the condensate is also employed to preheat fresh quantities of impure solution in a preheating step which precedes the vaporization step and wherein the condensate is in out-of-contact and substantially counterflow heat exchange with incoming solution. In this preheating step, the pressure that was initially imparted to the vapor is permitted to become dissipated and likewise the condensate is preferably cooled nearly to the temperature of the incoming liquid. The means hereinbelow described whereby this result may be accomplished is likewise a feature of this invention. A further feature of this invention resides in withdrawing the concentrated solution and passing it out of the system in out-of-contact and preferably counterflow heat exchange with incoming solution to be distilled.

Features of this invention likewise relate to maintenance of approximately equal thermal capacities on both sides of the heat exchange portions of the apparatus. An advantage resulting from such equalization of thermal capacities lies in elimination of cooling means other than the potential cooling capacity of incoming impure solution.

While this invention may be considered, by way of example, as applied to the recovery of potable water from sea water, it should be understood that the term "sea water" includes any water which, because of its content of inorganic or organic salts or other materials, is unfit for drinking or other purposes. It should be understood that this invention is also applicable in the distillation treatment of other liquids than water, where it is desired to recover the liquid free from dissolved materials contained therein. Moreover, it is applicable to the concentration of dilute solutions, such as brines, caustic solutions, sugar solutions, sap, wash water and the like from which it is desired to remove the water or other solvent and to recover valuable non-volatile materials, or materials of lower volatility than the solvent.

Further purposes, features and advantages of this invention will be apparent in connection with the following description of certain illustrative embodiments of this invention in connection with the accompanying drawings, wherein—

Figure 1 is a side sectional view partly diagrammatic of one form of apparatus embodying this invention, which apparatus is suitable for separation of a volatile from a non-volatile component by simple distillation;

Fig. 2 is a detail view of a portion of the coil 6 in Fig. 1;

Fig. 3 is a detail view of the coil shown in Fig. 2 before it is compressed to its ultimate "pancake" form;

Fig. 4 is a side sectional view of a portion of the apparatus shown in Fig. 1 illustrating an alternative type of compressor;

Fig. 5 is a side sectional view largely diagrammatic of an alternate embodiment of this invention wherein the apparatus is disposed horizontally;

Fig. 6 is a side sectional view largely diagrammatic of an embodiment of this invention employing separate preheating and vaporization chambers;

Fig. 7 is a side sectional view largely diagrammatic of the distillation apparatus shown in Fig. 1 in a combination wherein the apparatus is applied to reconcentrate brine used in dehumidifying air;

Fig. 8 is a cross-sectional view of an alternative form of the lower portion of overflow pipe, the overflow pipe 112 shown in Fig. 7 being of this construction; and Fig. 9 is a side sectional view of distillation apparatus of the character shown in Fig. 1 in a combination wherein the apparatus is applied in tandem for solvent recovery in an extraction process.

In Fig. 1 there is shown a compressor indicated generally by the reference character 1, which is shown comprising a reciprocating piston 60 adapted to draw vapor from the interior of vaporization chamber 4 through pipe 2 controlled by oneway valve 61 and discharge it at higher pressure through pipe 3 controlled by oneway valve 62. The vaporization chamber 4 may comprise the upper part of a cylindrical liquid and vapor-tight shell or tube indicated generally by the reference character 63 which is closed at each end except for an opening at the top communicating with pipe 2 and an opening near or at the bottom communicating with pipe 9. The pipe 3 carrying the discharge from compressor 1 passes through the wall of the chamber 4 near or at the top and communicates with the upper end of the exchanger in chamber 4 which is indicated generally by the reference character 5 and which consists preferably of a header 16 (with which the pipe 3 is in direct communication) and coils 64 coiled about the central tube 12 in layers alternately clockwise and counter clockwise, a plurality of such tubes preferably being arranged in parallel. The exchanger 5 is arranged to fill substantially all of the cross section of chamber 4 except the part occupied by the central tube 12, but is so wound that liquid can flow freely upwards through the interstices around the individual tubes of the coils.

A second exchanger 6 is arranged in shell 63 immediately below exchanger 5, and extends practically to the bottom of shell 63. The portion of the shell 63 occupied by exchanger 6 may be designated as the preheating chamber 68. The exchanger 6 may be composed of relatively fewer tubes or of tubes of smaller cross sectional area than the tubes of exchanger 5, so that they have a lesser total cross-sectional area of flow. In Fig. 2, which represents one suitable form for this exchanger, a single tube is shown wound in the form of "pancake" coils; that is, in horizontal layers, spiraling alternately outwardly from the center tube to the wall of chamber 68 and inwardly again. In this way, the fluid flowing through coil 6 progresses from layer to layer continuously downward through the coil, while coming in contact with the entire cross section of chamber 68, except the portions occupied by the center tube. The coils 6 conveniently may be initially shaped as shown in Fig. 3 and then compressed to the form shown in Fig. 2. The upper end of exchanger 6, adjacent to exchanger 5, is joined to and communicates with the lower end of exchanger 5 through a suitable header 7. The lower end of exchanger 6 terminates in pipe 8 which passes through the wall of shell 63, and from which the distillate is discharged. The exchanger 6 may be preferably arranged to take substantially the entire pressure drop from the discharge pressure of the compressor to atmospheric pressure since this will give high rates of heat transfer in a small space. The exchanger 5 may also be more or less reduced in section or number of tubes at the lower end as the vapor progressively condenses and the volume to be handled consequently decreases, but this is of only minor advantage, since pressure drop in this section should be kept low. In any event, it is necessary for practical efficiency, that the exchanger 6 shall be of relatively small cross section in comparison with the exchanger 5. In one good design for water, for example, the cross-sectional area of exchanger 6 is about one-twelfth of the cross-sectional area of the exchanger 5. This ratio will vary with the ratio of liquid to vapor density for the particular liquid in use and with the pressure developed by the compressor. The proper control of pressure drop and flow in the coil constitutes an important feature of the present invention.

The convolutions comprising the coil of exchanger 6 may be suitably spaced to allow narrow uniform passages therebetween, through which liquid flowing through chamber 68 may pass, thereby coming in contact with all portions of the surface of the tubes.

A pipe 9, which may contain a filter 10 for removing solid material, such as dirt or scale, and a valve 11, communicates with the interior of vessel 63, at its lower end and near the point where pipe 8 emerges.

A tube 12 with one end, 13, opening into chamber 4 at or near the top end of the exchanger 5, extends downward through the center of exchangers 5 and 6 and through the wall of chamber 68, to act as an overflow, discharging through valve 14 any liquid reaching point 13. When the apparatus is to operate at atmospheric pressure, valve 14 may be omitted.

The entire shell 63 except at its extreme lower end, the compressor 1, and the connecting pipes 2 and 3 are heavily insulated against heat losses by the covering 18, of any suitable heat insulating material such as magnesia, corrugated asbestos paper or mineral wool.

The operation of my process in the apparatus illustrated in Fig. 1 can best be understood by its application to a specific example such as the separation of fresh potable water from sea water as follows:

The raw sea water is supplied through the filter 10 and the pipe 9, the rate of flow being controlled by valve 11. The sea water enters preheating chamber 68 and passes continuously upward in shell 63 and into chamber 4 at the same time passing through the interstices of exchanger 6 and of exchanger 5, in intimate contact with the outside surfaces of the tubes contained in said exchangers.

As the sea water passes upward in chamber 68 it is heated nearly to its boiling point by two streams of fluid passing downward in out-of-contact and counter current heat exchange through exchanger 6 and through tube 12 respectively. The origin of these two streams will presently be described. In passing over exchanger 5 the sea water is further heated by vapors condensing therein, whose origin will presently appear, and the sea water is thus made to boil vigorously so that a substantial portion of it is vaporized in vaporization chamber 4. On reaching the level of end 13 of tube 12 the vapor is liberated into space 15 in chamber 4 and the liquid overflows into tube 12 and passes down through the tube 12 and out through valve 14. In passing through the lower portion of tube 12, it gives up heat to the entering sea water which surrounds tube 12, in intimate thermal contact therewith, forming one of the two streams referred to above.

The vapor released into space 15 may be separated from fog and entrained liquid by suitable baffles 17 and then is withdrawn through pipe 2 into compressor 1. From compressor 1 it is discharged at a pressure corresponding to a condensing temperature higher than the boiling point of the concentrated sea water at the surface of the solution in chamber 4 into pipe 3 from which it enters the tubes forming exchanger 5.

This compressed vapor furnishes the heat previously referred to for boiling the water surrounding exchanger 5 and when the apparatus is in steady operation the vapors will be substantially all condensed by the time they reach the end of exchanger 5 and enter exchanger 6. If heat losses from the surfaces of the apparatus to the surrounding air are less than the heat of compression supplied by the compressor, the condensation of the vapors in exchanger 5 will evaporate an equivalent amount of liquid and supply it as vapor to the compressor, so that the process is self-sustaining. While passing through preheating exchanger 6 the condensate from exchanger 5, which is hot as it enters exchanger 6, will be cooled, giving up its heat to the entering sea water, and thus heating this sea water as the second of the two streams previously referred to. The condensate is finally discharged at a temperature only a few degrees warmer than the entering sea water.

Considering now the heat balance of the system, the process may be regarded as composed of three interrelated stages. First there is a counter current heat exchange in preheating chamber 68 between the sea water surrounding the tube of exchanger 6 and tube 12, and the streams of liquid within the tube of exchanger 6 and within tube 12. In this out-of-contact counter current exchanger apparatus which will be referred to for brevity as the "preheater" or "preheating zone" it is desirable so far as possible to have the total heat capacity of the cooling streams as nearly as possible equal to the total heat capacity of the raw water being heated. This condition is substantially fulfilled in the present arrangement. There will, however, always be a small temperature difference between the streams of condensate and overflow, in exchanger 6, and tube 12, and the sea water entering in pipe 9. This represents a small but unavoidable loss of heat. There is also always a certain amount of heat lost from the hotter portions of the walls of shell 63 and from the surfaces of the compressor and connecting pipes. According to the present invention, this heat loss is compensated by the work of compression of the vapor supplied by the compressor 1.

It is desirable, therefore, to pass all of the effluent liquids through the preheater so far as may be practicable. The condensed vapor or distillate being of high purity will give no trouble in the coils of tubing, but the overflow may contain precipitated solids and scale forming material which requires clearing of surfaces with which it comes in contact. I have therefore provided a simple form of straight tube (the pipe 12) which is easily cleaned. When clean liquids are handled, the simple pipe 12 may be replaced by a coiled tube wound among the turns of exchanger 6 as indicated in Fig. 5 and in Fig. 6 (described below) which may give better efficiency of heat exchange. Or the tube 12 may be cored in the usual manner in order to provide a thin annular passage for the overflow liquid in close contact with tube 12 as shown in Fig. 8, for example.

Since the pressure developed by the compressor must, in general, be dissipated as the liquid is withdrawn, and since high velocities are especially advantageous in promoting heat exchange between liquid and metal walls, it is desirable to utilize a large part of the pressure developed by the compressor to force the liquid through the exchanger 6.

The second element of the heat balance is the exchanger 5 which transfers latent heat of the condensing vapor inside the coils 64 to the boiling liquid around the coils. This section of the apparatus which may be referred to as the "vaporization zone" differs from the one last described in that (a) the amounts of heat to be handled may be much greater, (b) the heat is transferred with little if any change in temperature of the fluids, (c) the rates of heat transfer are naturally high, and (d) the volume of material is changing rapidly as the vapor is liberated or condensed. The nearly constant temperatures in this section make counter current heat transfer less necessary than in the preheater but for the highest efficiency, counter current flow is desirable. In particular, the gradual concentration of solids in the sea water as it is boiled, make the boiling point rise somewhat near the top of the exchanger, except where this is offset by the reduction in pressure as the surface of the liquid is approached. On the other hand, the vapors leaving the compressor are at a temperature above their condensing temperature and are therefore superheated, and they will therefore heat the upper end of the exchanger 5 somewhat hotter than the portions further down in which they are condensing. Moreover, there is necessarily a certain amount of pressure drop in the exchanger 5, which means that the vapor condenses at a higher pressure and therefore at a higher temperature at the beginning than at the lower end of the exchanger 5. This effect is kept as small as possible by making exchanger 5 of low resistance to flow. The only heat losses from this section are radiation and convection from the hot surfaces of the chamber 4, and these are kept small by suitable insulation.

The third element is the compressor 1, which raises the pressure of the vapor, and thereby adds energy which appears mainly as heat of compression. The compressor 1 may comprise a reciprocating piston as shown in Fig. 1. However, other types of compressors or blowers may be used of any conventional reciprocating, rotary or centrifugal type. It will be noted that a steam ejector or thermocompressor so-called cannot be used in my process since the addition of steam in an appreciable amount from an outside source upsets the heat balance and necessitates the use of additional cooling means. A type of compressor which is advantageous because it minimizes the amount of lubricant that comes in contact with the vapor withdrawn from the vaporization chamber is shown in Fig. 4. In Fig. 4 the parts correspond to those shown in Fig. 1 and are indicated by corresponding reference characters except that, instead of the piston 60 and valves 61 and 62, there is shown a rotary compressor including rotating blades 74 mounted on shafts 75 within casing 76 adapted to compress the vapor withdrawn through pipe 2 from evaporation chamber 4, and impel it through pipe 3 into evaporation exchanger 5.

I have found that by the arrangement of parts shown it is possible to make the heat of compression just equal to the combined losses due to (1) radiation and (2) the temperature difference between the incoming raw water and the effluent streams, and this balance is moreover self-adjusting over a reasonable range of operating conditions. Thus in the apparatus just described, if the heat of compression increases due to a decrease in pump efficiency, for example, a small amount of vapor will be carried down the tube 12, causing the discharge from this tube to rise slightly in temperature, thus removing the excess heat. Although I have described the apparatus as having two separate parts corresponding to the exchangers 5 and 6, there is in operation no actual sharp line between these two parts and in fact the end of the vaporization exchanger and the beginning of the preheating exchanger are found to vary slightly in such a manner as to contribute to the self-regulating features of the process. I therefore prefer to maintain a counter flow even in exchanger 5, at least at its lower end. In order to obtain high efficiency it is preferable to cool the liquid resulting from the condensation of the compressed vapor by heat exchange with solution in the preheater until the difference between the temperature of the condensate and the temperature of the fresh solution entering the preheater is not substantially more than the difference between the boiling point of concentrated solution from which vapor is evolved in the vaporization zone and the condensing temperature of the compressed vapor.

The thermal balance generally described above can be better understood by a specific example. Sea water containing 3% salt (specific heat 0.98) enters through pipe 9 at 45° F. at the rate of 30 pounds per hour. In passing through preheater chamber 68 it is heated to 208° F., thereby receiving 4800 B. t. u. per hour. In passing through vaporization chamber 4, it is heated to its boiling point 213.4° F. and 5/6 of it is converted to vapor, or 25 pounds per hour. The boiling point at the surface of the liquid in chamber 4 has then risen to 224° F. The overflow into tube 12 at the end 13 of the tube is at the rate of 5 pounds per hour with a concentration of 18% salt. The heat absorbed by sea water from vaporization chamber 5 is 24,500 B. t. u. The vapor supplied to the compressor is 663 cubic feet per hour, and this is compressed to 3 pounds gauge in a compressor which uses 800 watts of electric power input to motor. The vapor leaves the compressor at 260° F., with a volume of 588 cubic feet. It starts condensation in coil 5 at 222° F. and ends condensation at a pressure of 2.7# and a temperature of 221° F.

The condensate is cooled in preheater exchanger 6 to 50° F. and the overflow in tube 12 is cooled to 110° F. at the discharge.

I have found that suitable dimensions for a still delivering 2½ gallons of distilled water per hour from sea water with a power consumption of 800 watts are as follows:

The exchanger 5 consists of twelve ¼" outside diameter, 20 gage soft copper tubes, each 25 feet long wound in four layers upon a 1⅞" outside diameter thin walled brass tube 12. The exchanger 6 consists of a single tube, 100 feet long, of tubing of the same size, wound in spiral pancake coils as indicated in Fig. 3.

The compressor displaces twelve cubic feet per minute and raises the pressure about 3 pounds per square inch.

In order to furnish the initial heat supply when starting from cold, one of the following devices may be employed.

If the mechanical-work-imparting means 11 is driven by a gasoline engine, the heat in the exhaust gases may be used to assist in heating the apparatus while starting. Thus, the hot exhaust may be circulated around a portion of shell 63 through a jacket 19, into which it passes through pipe 20 and from which it flows out through pipe 21. If electric power is to be used it may be desirable to replace jacket 19 by an electric heating coil. Such means are desirable in order to speed up the starting operation, but are not necessary as it is possible by use of an oversize motor and compressor to so design the apparatus that it will start without external supply of heat. In any case, the heating is cut off as soon as normal operation starts. The entire apparatus is covered with a sufficient thickness of heat insulating material 18 to reduce the minimum energy losses from the entire apparatus including shell 63, pipes 2 and 3 and compressor 1, and the loss of heat in the fluid discharged from pipes 8 and 12 to or below the energy input to device 1.

As illustrative of one type of installation, the 2½ gallon per hour device mentioned above has a compressor operating with an efficiency of about 18%, the motor drawing approximately 800 watts. The shell 63 is a brass tube 4" outside diameter and 5 feet long. The insulation 18 consists of a 1-inch layer of magnesia pipe-covering over all parts in contact with hot liquids or vapors and a 1-inch layer of cellular asbestos pipe-covering over the magnesia, making a total thickness of approximately 2 inches. In larger units the compressor efficiency will increase, reducing the relative power supplied to the device 1 but the ratio of surface subject to heat loss, to the fluid handled will also decrease, so that approximately the same degree of insulation will be required. By having the apparatus insulated and omitting external sources of heat during the operation of the process, the process is carried out while substantially thermally isolated from all external sources of heat and cold.

By suitably designing the exchanger 6, it is possible to make the device automatically remain in perfect thermal balance, the efficiency of the heat exchange adjusting itself so that the liquid leaving pipes 8 and 12 will remove any slight excess of energy supplied in device 1.

The practical operation of my process and apparatus represents a marked improvement in simplicity, while at the same time providing adequate means for insuring correct functioning of all parts at all times. For control, I prefer to have a pressure gauge 70 and thermometer 71 located at the compressor discharge, and some meter means 72 for observing the rate of discharge from the overflow, as for example a weir box or other flowmeter, or simply an open drip pipe.

To start my apparatus, valve 11 is opened to admit water slowly to chamber 4, and the compressor is started. If the latter is of the positive displacement type, a by-pass valve 22 will be provided in by-pass 23 to prevent excessive pressure in the coils while air or other non-condensable gases are being forced out through the coils of exchangers 5 and 6 by the compressor. With a centrifugal compressor, this is unnecessary. The auxiliary heating means is then thrown on and the apparatus is allowed to operate until distillate appears at the outlet 8, or until the pressure on gauge 70 drops to normal with by-pass valve 22 closed. The auxiliary heat is then cut off, and the by-pass valve 22 is closed. The only operating control that requires attention is then the inlet valve 11 which is adjusted from time to time to maintain the desired overflow rate. Any well-known means may be provided to control valve 11 to maintain a constant overflow rate.

If it is desired to reduce the rate of distillation, this can best be done by reducing the speed of the compressor. When this is not convenient, the by-pass valve 22 may be partly opened, though this is not desirable for continuous operation, since it wastes power. When a centrifugal compressor or other constant pressure device is used, the rate of distillation may be controlled by throttling either the suction or the discharge, again with some slight loss of efficiency.

When it is desirable to eliminate all auxiliary heating means for starting, a throttle valve 73 may be placed in pipe 3 just beyond the by-pass. By closing this throttle valve and partly closing the by-pass valve 22, the pump will heat up rapidly. When operating temperature has been reached, the throttle valve may be gradually opened and the by-pass valve gradually closed, forcing the hot air and vapors from the compressor through the coils of exchangers 5 and 6 and heating the entire apparatus. If this method of starting is adopted the compressor and motor or other driving mechanism may preferably be designed for a somewhat greater load and pressure than required in normal operation.

It should be noted that one distinctive feature of this apparatus is that the pure vapor while condensing is necessarily always at a pressure greater than the surrounding fluid so that any trace of leakage that may occur will result merely in a loss of a portion of the distillate, and never in contamination of the product with impure material. This is in sharp distinction to the ordinary condenser cooled by a separate stream of water, in which no particular relation exists between the pressure of the condensing vapor and that of the cooling water. The latter is often at a pressure substantially above that of the condensing vapor, and contamination by condenser water leakage is a common source of trouble in most commercial stills.

A second common source of trouble in commercial stills, which is readily controlled by my process, is the "carry-over" of liquid droplets into the condensing vapor. These droplets carry dissolved solids or other materials which contaminate the product. In my process any tendency to carry over liquid into the compressor will be immediately apparent to the operator by a drop in the temperature of the discharge from the compressor. This discharge temperature represents superheating of the vapor due to the work of compression, so that in the illustration given above, the discharge from the compressor normally operated steadily at about 260° F. Any trace of liquid entering the compressor will cause a more or less erratic drop in this temperature of considerable magnitude. Thus, if 1% of liquid is carried over into the compressor in the form of fog it will cause an average drop in temperature of 20° F. and may cause a momentary drop of much more than this. The superheating of the vapor by the work of compression has therefore a practical advantage in operation of the process.

This liquid carry-over can, however, occur in a proper design of my apparatus only when unusual conditions such as when materials causing frothing of the raw water are present, because my apparatus cannot ordinarily be operated at a capacity greater than that for which it was designed, since this may be limited definitely by either the volume displacement or by the pressure than can be developed by the compressor. The liquid level, moreover, may be fixed by the overflow pipe at point 13. Consequently the danger from liquid carry over is much less than in ordinary types of still. Moreover, many of the types of compressor, which may be used, such as the rotary compressors, and especially the centrifugal compressor for large volumes of vapor, have, I find, a marked tendency to throw out particles of liquid onto the walls of the casing, and hence act as highly efficient moisture separators. When such action is to be relied upon for any considerable length of time, suitable provision for cleaning and removing the accumulated dirt carried by the moisture must be provided. Such means are well known in the art, for example, disconnecting the discharge piping and flushing the compressor with water.

In Fig. 5 distillation apparatus corresponds to that shown in Fig. 1 but is modified in certain particulars so that the apparatus is better suited for horizontal disposition. Where the parts correspond to the parts shown in Fig. 1 like reference characters are used. Thus solution to be distilled is introduced through line 9 controlled by valve 11 after having passed through filter 10, into shell 80 which is disposed horizontally. Like the shell 63 in Fig. 1, the shell 80 includes a preheating chamber 68 and a vaporization chamber 4. The vapor is withdrawn from vaporization chamber 4 by line 2 after having passed the baffles 82 to compressor 1 and is returned by line 3 to the vaporization exchanger 5 in chamber 4. This vaporization exchanger is merely indicated diagrammatically. It may, for example, be similar to that shown in Fig. 1 or of any equivalent character. Similarly, the preheater exchanger 6 is merely indicated diagrammatically and may correspond to that shown in Fig. 1 or may be of any equivalent structure. The condensate is withdrawn from the preheater exchanger through outlet 8. In this horizontal embodiment it is usually preferable to have a baffle 81 which assists in preventing undue intermixing of liquid in the preheating chamber 68 and in the vaporization chamber 4 of shell 80 so that the incoming liquid will be first preheated in one chamber and thereafter caused to evolve vapor in the other chamber. The draw-off line 12 in this modification is shown as including a coil 83 which serves to increase the duration of the out-of-contact heat exchange between the concentrated solution taken off through line 12 and the solution in chamber 68. In Fig. 5, insulation surrounding the shell 80, compressor, lines 2 and 3, etc., is not shown but may correspond to that shown in Fig. 1. Moreover, a heating jacket such as that shown in Fig. 1 may be used to assist in starting the distillation.

The operation of the apparatus shown in Fig. 5, is similar to that above described in connection with the apparatus shown in Fig. 1.

In Fig. 6 an alternate form of apparatus is shown which is essentially similar to that shown in Fig. 1 but is designed primarily to illustrate the use of separated preheating and vaporizing chambers. In this modification solution to be distilled is introduced through line 90 by any suitable means such as pump 91 into the tank 92 which in this modification is the preheater chamber. The tank 93 which is separate from the tank 92 constitutes the vaporization chamber. Solution is directed from tank 92 to tank 93 by line 94 and vapor evolved from the solution in tank 93 is withdrawn through vapor line 95 to compressor 96 (which in this case is illustrated diagrammatically as of a centrifugal type compressor) where the vapor is compressed and returned by line 97 to vaporization exchanger 98 which in this case comprises a plurality of tubes 99 between headers 100 and 101 although the showing in the drawing is diagrammatic. The condensate is taken from header 101 by line 102 to preheater exchanger 105 in preheater tank 92. The preheater exchanger 105 is shown diagrammatically and may comprise a coil such as the coil 6 shown in Fig. 1. The condensate is taken from the preheater exchanger by outlet 106. The draw-off line 127 withdraws concentrated solution from tank 93 and the level of the mouth 108 thereof determines the level of liquid in tank 93. The concentrated liquid is taken to a coil or preheater exchanger 111 in tank 92 which is shown diagrammatically and may consist of a coil having convolutions intermediate the convolutions of the exchanger 105. The condensate is taken from the system by line 110 while suitable insulation (not shown) should be placed about the tanks 92 and 93, about lines 94, 95, 97, 102 and 127, and about compressor 96. Moreover, a heating jacket similar to that shown in Fig. 1 may be disposed about tank 93 for use in starting operations. The use of the apparatus shown in Fig. 6 is essentially the same as that described in connection with Fig. 1.

In connection with Figs. 1, 5 and 6 it is apparent that the preheating chamber and vaporization chamber may be either parts of a single tank or shell or may be in the form of separate tanks or shells. Moreover, while the solution is introduced into the preheating zone and is then directed into the vaporization zone, there is not necessarily any sharply defined line of demarcation between these zones. Furthermore, the point where the solution will begin to be vaporized will depend on factors of operation such as the degree of compression used, the efficiency of the compressor, the efficiency of the insulation, the difference between the boiling point of the withdrawn concentrated solution and the boiling point of the withdrawn vapor, and the like.

In the operation of the distillation apparatus the pressure in the system can be varied as operating conditions may require. When the valve 14 is left open the pressure of the atmosphere affords a suitable control and where such pressure conditions can be used it is ordinarily desirable to do so. However, by closing the valve 14 somewhat and introducing solution to be distilled under pressure supplied by gravity or by a pump, the pressure in the system as a whole can be increased and the compressor 1 can be operated to maintain the necessary pressure variation within the system in the manner above described. In such case it is desirable to have the pressure at which condensate is discharged from the system controlled by a valve, e. g., valve 117. Conversely distillation under vacuum may be employed in the practice of this invention. Thus by connecting withdrawal line 12 in Figs. 1 and 2 and line 110 in Fig. 6 to a suitable exhausting apparatus (not shown) the solution may be vaporized under a vacuum. Where the degree of vacuum is less than the pressure increase which is desired for efficient operation and which is effected by the compressor, then the withdrawal of condensate requires no source of vacuum applied to the line through which the condensate is withdrawn. However, when distillation under high vacuum is desired it is desirable to connect both the draw-off line for concentrated solution and the draw-off line for the condensate to suitable exhausting apparatus.

As a further illustration, I will describe my invention as applied to the concentration of a solution, and in particular to the concentration of a solution of calcium chloride such as is used for dehumidifying air or other gases. The removal of moisture from air in connection with air conditioning is often accomplished by spraying the air with a solution of calcium or lithium chloride or other soluble chemical compound. Such solutions absorb moisture thereby diluting themselves to the point where they are no longer effective. When a supply of heat is not available to evaporate this moisture and re-concentrate the solution, it is necessary to throw away a portion of the solution, making it up with fresh chemicals. My invention furnishes a method of regenerating such solutions, using only electric power which is generally required for other purposes in such installations. Such an installation is shown diagrammatically in Fig. 7. A current of air is drawn into a spray chamber 25 by fan 28 where it is subjected to a spray of cold brine from the nozzles 27. The brine after acting upon the air to remove the moisture collects in the sump 26; whence it passes through pipe 109 and through pipe 119 controlled by valve 111 into the distillation apparatus of the character shown in Fig. 1 for example. In the apparatus as shown in Fig. 7 the evaporation exchanger 5 and preheating exchanger 6 in shell 163 are only shown diagrammatically and in other respects certain details such as the insulation have been omitted or merely indicated diagrammatically. The water and any volatile odoriferous material are distilled off and are removed as described previously, and discharged through pipe 108, and in this case may go to waste. The concentrated overflow brine will pass through pipe 112 and valve 114 to pump 30 which will recirculate it through cooler 32 to the sprays 27. As shown in Fig. 8 the draw-off line 112 that is in shell 163 contains a core member 113 which is adapted to cause the concentrated solution that is drawn off to flow in a thin film between the line 112 and core member 113, thereby promoting the heat exchange between the liquid drawn off through line 112 and the solution surrounding this line. As it may be desirable to circulate more liquid to the sprays than is passed through the still, a by-pass 29 controlled by valve 31 is provided which allows a controlled portion of the dilute brine from sump 26 to pass directly to the pump 30, where it mixes with the concentrated brine from the still.

In this case the heat balance may, for example, be somewhat as follows: A solution of calcium chloride saturated at 32° F. is sprayed into chamber 25, collecting in sump 26 at a temperature of about 50° F. From the sump 26 it passes to the still 4, in which the water vapor picked up from the air in chamber 25 is removed and discharged through pipe 8. The compressor 1 on the still removes this vapor at about 263° F. and compresses it to about 28 lbs. per square inch gage. The concentrated brine from still 4 is removed through pipe 112 and valve 114 by means of pump 30 at a temperature of 55° F. and forced through cooler 32, where it is cooled in any conventional manner and the cooled brine is then delivered to the sprays 27 for further use.

It will be noticed that the brine from the spray chamber 25 may be at a lower temperature than the surrounding air and it is a marked advantage of my apparatus that the concentrated brine leaving the still, which is to be recooled, is at a temperature only a few degrees warmer than the brine leaving the chamber 25. A marked saving in refrigeration results.

As a further illustration of the use of my invention, I give an example of its use in a so-called solvent extraction system. In the manufacture of vegetable or animal fats it is customary to dissolve the fatty substance out of the associated fibres or tissues by means of solvents such as naphtha. The fatty substance is then recovered by evaporation of the solvent, leaving the pure fat. The vaporized solvent is condensed and used for further extraction of more fat. In such a process my invention exhibits exceptional utility, owing to the simplicity of the equipment, to the elimination of all external sources of heat, which is particularly important on account of the inflammability of the solvents used, and particularly to its ability to carry out the distillation at any desired pressure or temperature.

For this purpose and for others in which it is desired to handle material over a wide range of concentrations, such as concentration of dilute brines, the use of two or more stages of distillation are desirable. For purposes of illustration a two stage process is described and illustrated in Fig. 9.

The vegetable matter to be extracted is placed in the chamber 33 and treated with solvent introduced through the pipe 35. The solvent saturated with the vegetable oil collects in the bottom 34 of vessel 33, or in a separate receiver or storage vessel and then flows through pipe 36 in an amount regulated by valve 37 into the concentrating still 38 passing up over the preheating and vaporization exchangers 6 and 5 (indicated diagrammatically) in the same manner as previously described. The volatile solvent vapors are compressed in the compressor 39 and pass downwardly through exchangers 5 and 6 wherein they are condensed and cooled as previously described, and pass out of pipe 40. The overflow which still contains a certain amount of solvent passes out pipe 41 into the stripping still 42 which also includes the diagrammatically indicated preheater and evaporation exchangers 6 and 5 and in which it is subjected to further distillation at a lower pressure or higher temperature or both, the oil now substantially free from solvent flowing or being pumped out through pipe 44 and pump 45 and the solvent being discharged through pipe 49. If still 42 is operated at a pressure lower than exists in pipe 35, or treating chamber 33, into which the solvent from pipe 49 is discharged, a pump 48 may be provided, as shown, to return the solvent from still 42. The purpose of dividing the distillation process into two parts in this case is that the last traces of solvent are very difficult to remove requiring high temperatures and/or a high vacuum or both, so that compressor 43 operating on still 42 requires very different characteristics from that of compressor 39 operating on still 38. In particular the compressor 43 will operate at a much lower efficiency than compressor 39, and it may even then be uneconomical to attempt to remove the last traces of solvent in still 42. In this case the oil discharged through pipe 44 may be further processed in any conventional type of stripping or deodorizing still 50.

While this invention has been described in connection with certain specific embodiments

I claim:

1. A method of distillation which comprises causing vapor to be evolved from a solution in a vaporization zone, compressing the evolved vapor to a pressure at which the condensing temperature of the compressed vapor is substantially above the boiling point of said solution, bringing the compressed vapor into out-of-contact heat exchange with said solution and condensing said vapor while in said heat exchange relation with said solution in a vaporization zone, withdrawing concentrated solution from which said vapor has been evolved, and preheating solution to be vaporized by out-of-contact and counterflow heat exchanged with said withdrawn solution and by out-of-contact and counterflow heat exchange with the liquid resulting from condensation of said compressed vapor, the concentration of said concentrated solution which is withdrawn being substantially the same as the concentration of the most concentrated solution in said vaporization zone.

2. A method of distillation which comprises causing vapor to be evolved from a solution, compressing the evolved vapor to a pressure substantially higher than the pressure of vapor at the surface of the solution, thereby substantially raising the temperature thereof to a temperature substantially higher than the boiling point of said solution, bringing the compressed vapor into out-of-contact heat exchange with said solution while at a temperature substantially higher than the temperature of said solution and condensing substantially all of such vapor by heat exchange with said solution at its boiling point, withdrawing concentrated solution from which vapor has been evolved, and then preheating solution to be vaporized by out-of-contact and counterflow heat exchange with the liquid resulting from the condensation of said compressed vapor and by out-of-contact and counterflow heat exchange with said withdrawn concentrated solution, the compression imparted to said withdrawn vapor being gradually and substantially completely dissipated in overcoming frictional resistance with the walls of confining conduit means while said vapor and condensate resulting therefrom is in said heat exchange relation with said solution thereby utilizing said compression to augment the velocity of said vapor and condensate resulting therefrom while in said heat exchange relation.

3. A method of distillation which comprises preheating a solution in a preheating zone, causing vapor to be evolved from the solution in a vaporization zone, causing fresh solution to flow into said preheating zone and from said preheating zone into said vaporization zone, withdrawing vapor from said vaporization zone, compressing the withdrawn vapor to a pressure at which the condensing temperature of the compressed vapor is above the boiling point of the solution in the vaporization zone, bringing substantially all of the compressed vapor into out-of-contact heat exchange with solution in said vaporization zone and condensing substantially all of said vapor while in said heat exchange relation with said solution at its boiling point in said vaporization zone, bringing the resulting condensate into out-of-contact and counterflow heat exchange with solution in said preheating zone, withdrawing concentrated solution from said vaporization zone and bringing said withdrawn concentrated solution in out-of-contact and counterflow heat exchange with solution in said preheating zone, all the heat required to heat and vaporize said solution in said zones being supplied by said heat exchange relations in said zones and the temperature differences in said zones being maintained approximately constant and the heat losses from the system being not greater than the heat of compression resulting from said compression of said withdrawn vapor.

4. A method of distillation which comprises preheating a solution in a preheating zone, vaporizing the solution in a vaporization zone, causing fresh solution to flow into said preheating zone and from said preheating zone to said vaporization zone, withdrawing vapor from said vaporization zone, compressing the withdrawn vapor, bringing substantially all of the compressed vapor into out-of-contact heat exchange with solution in said vaporization zone, condensing substantially all of said vapor while in out-of-contact heat exchange relation with said solution at its boiling point in said vaporization zone, and cooling said condensate while said condensate is in out-of-contact and counterflow heat exchange with solution in said preheating zone, the pressure increment imparted in said compression step being substantially completely dissipated while said vapor and condensate are in said out-of-contact heat exchange with said solution in said vaporization and preheating zones and said condensate being counterflowed in said preheating zone in a passage so restricted that a substantial part of said pressure increment is dissipated in said vaporization zone and a substantial part of said pressure increment is dissipated in said preheating zone by frictional resistance with the walls of said passage, thereby transmitting substantially all of the work introduced into the system during said compression step to solution to be vaporized and using that portion of said work remaining in the condensed liquid to augment the velocity of said condensate liquid in said passage in counterflow heat exchange with said solution.

5. A method of distillation which comprises preheating a solution in a preheating zone, causing vapor to be evolved from said solution in a vaporization zone, causing fresh solution to flow into said preheating zone and from said preheating zone into said vaporization zone, withdrawing vapor from said vaporization zone, compressing the withdrawn vapor, bringing the compressed vapor into out-of-contact and counterflow heat exchange with solution in said vaporization zone, condensing the vapor while in out-of-contact heat exchange with said solution, withdrawing concentrated solution from said vaporization zone at a rate which maintains the concentration of the solution withdrawn from said vaporization zone substantially constant and cooling the resulting condensate while said condensate is in out-of-contact and counterflow heat exchange with solution in said preheating zone until the difference between the temperature of said condensate and the temperature of fresh solution flowed into said preheating zone is not substantially more than the difference in boiling point between the boiling point of solution from which said vapor is evolved in said vaporization zone and the condensing temperature of the compressed vapor.

6. A method of concentrating a solution which comprises passing solution to be concentrated through a preheating zone and into a vaporization zone, removing vapor evolved from the solution in the vaporization zone and compressing it to a pressure substantially greater than the pressure of the vapor at the surface of solution in the vaporization zone and so as to superheat the vapor, bringing the compressed and superheated vapor into out-of-contact and counterflow heat exchange with solution in said vaporization zone thereby causing vapor to be evolved from said solution and the solution to become relatively more concentrated and causing the vapor to condense simultaneously with said vaporization, the flow of said solution in said counterflow heat exchange being toward the normal liquid level in said vaporization zone so that the liquid having maximum concentration is at said normal liquid level of solution in said vaporization zone, and passing the resulting condensate in out-of-contact and counterflow heat exchange with solution in said preheating zone, withdrawing concentrated solution from said evaporating zone from adjacent the normal liquid level of said solution in said vaporization zone and passing said withdrawn concentrated solution in out-of-contact and counterflow heat exchange with solution in said preheating zone, and maintaining the same liquid level in said vaporization zone substantially constant.

7. A method of distillation which comprises preheating a solution in a preheating zone, causing vapor to be evolved from the solution in a vaporization zone, causing fresh solution to flow into said preheating zone and from said preheating zone into said vaporization zone, withdrawing vapor from said vaporization zone, compressing the withdrawn vapor to a pressure at which the condensing temperature of the compressed vapor is above the boiling point of the solution in the vaporization zone, bringing the compressed vapor into out-of-contact and counterflow heat exchange with solution in said vaporization zone and condensing said vapor while in said heat exchange relation, bringing the condensate into out-of-contact and counterflow heat exchange with solution in said preheating zone, withdrawing concentrated solution from said vaporization zone and bringing said withdrawn concentrated solution in out-of-contact and counterflow heat exchange with solution in said preheating zone, the said solution, vapor, condensate, and concentrated solution being maintained substantially thermally isolated from all external sources of heat and cold during the process.

8. A method of distillation which comprises causing vapor to be evolved from a solution in a vaporization zone by counterflow heat exchange with a heated fluid, said solution flowing toward the normal liquid level of solution in said vaporization zone, thereby concentrating the solution, supplying fresh unconcentrated solution to said vaporization zone, and causing concentrated solution from said vaporization zone to flow in out-of-contact heat exchange with unconcentrated solution supplied to said vaporization zone to preheat the unconcentrated solution that is supplied to the vaporization zone, said concentrated solution being withdrawn from adjacent the normal liquid level in said vaporization zone.

9. A method of distillation which comprises introducing a solution to be concentrated into a pre-heating zone and passing said solution from said preheating zone into a vaporization zone, removing vapor evolved from the solution in the vaporization zone and compressing it to a pressure at which the condensing temperature is substantially above the boiling point of the solution from which the vapor is evolved, bringing substantially all of the compressed vapor into out-of-contact and counterflow heat exchange with said solution and condensing substantially all of said vapor in said out-of-contact heat exchange relation with solution in said vaporization zone, cooling said condensate by out-of-contact and counterflow heat exchange with solution in said preheating zone, and maintaining normal liquid level in said vaporization zone substantially constant by causing said solution to be introduced into said vaporization zone at a greater rate than the rate of removal of said solution from said vaporization zone in vapor form and causing the excess unevaporated solution reaching the normal liquid level to overflow into a draw-off zone, the overflow level determining the normal level of solution in said vaporization zone.

10. A method of distillation which comprises introducing a solution into a preheating zone and passing said solution into a vaporization zone, causing vapor to be evolved from said solution in said vaporization zone, compressing the evolved vapor to a pressure at which the condensing temperature of the compressed vapor is substantially above the boiling point of said solution, bringing the compressed vapor into out-of-contact heat exchange with said solution in said vaporization zone and condensing said vapor while in said heat exchange relation, preheating solution in said preheating zone by out-of-contact and counterflow heat exchange with liquid resulting from condensation of said compressed vapor, and withdrawing concentrated solution above a predetermined level in said vaporization zone from said vaporization zone while maintaining the rate of introduction of solution into said vaporization zone substantially in excess of the rate of removal of solution from said vaporization zone in the form of vapor and withdrawing vapor from said vaporization zone so as to maintain the pressure in said vaporization zone below a predetermined pressure, said withdrawn vapor being in addition to vapor withdrawn from said vaporization zone by said compressor.

11. A method of distillation which comprises causing vapor to be evolved from a solution into a vaporization zone, compressing the evolved vapor to a pressure at which the condensing temperature of the compressed vapor is substantially above the boiling point of said solution, bringing the compressed vapor into out-of-contact heat exchange with said solution in said vaporization zone and condensing said vapor while in said heat exchange relation with said solution, preheating solution to be vaporized by out-of-contact and counterflow heat exchange with the liquid resulting from condensation of said compressed vapor, and withdrawing concentrated solution from the vaporization zone, the vapor in said vaporization zone being maintained in communication with a region of substantially constant pressure, this communication being of a nature to keep distillation conditions substantially constant.

12. Distillation apparatus which comprises in combination a chamber adapted to contain a solution, a compressor adapted to compress a vapor, means arranged for directing vapor from the interior of said chamber to said compressor for compression thereof, heat exchange means arranged to maintain a fluid in out-of-contact and counterflow heat exchange relation with solution in said chamber, means arranged for directing vapor compressed by said compressor from said compressor into said heat exchange means in out-of-contact and counterflow heat exchange relation with solution in said chamber, preheating means including container means arranged to contain a solution, and means arranged for directing solution contained in said container means into said chamber, said preheating means including first and second heat transfer means arranged to maintain a liquid in out-of-contact and counterflow heat exchange relation with solution in said container means, means arranged for directing a liquid which results from condensation of vapor in said heat exchange means in out-of-contact heat exchange relation with solution in said chamber from said heat exchange means and into said first heat transfer means in out-of-contact and counterflow heat exchange relation with solution in said container means and means arranged for withdrawing solution from said chamber and directing said withdrawn solution into said second heat transfer means in out-of-contact and counterflow heat exchange relation with solution in said container means.

13. Distillation apparatus which comprises in combination means for containing a solution including a vaporization chamber and a preheating chamber, means arranged for directing a solution into said preheating chamber, means arranged for directing solution from said preheating chamber into said vaporization chamber, a compressor adapted to compress a vapor, means arranged for directing vapor from the interior of said vaporization chamber into said compressor for compression therein, heat exchange means arranged to maintain a fluid in out-of-contact heat exchange relation with solution in said vaporization chamber, means arranged for directing vapor compressed by said compressor from said compressor into said heat exchange means in out-of-contact heat exchange relation with solution in said vaporization chamber, heat transfer means arranged to maintain a liquid in out-of-contact heat exchange relation with solution in said preheating chamber, means arranged for withdrawing concentrated solution from said vaporization chamber at approximately the normal liquid level of solution in said vaporization chamber and directing said withdrawn solution into said heat transfer means in out-of-contact heat exchange relation with solution in said preheating chamber.

14. Distillation apparatus which comprises in combination means for containing a solution including a vaporization chamber and a preheating chamber, means arranged for directing a solution into said preheating chamber, means arranged for directing solution from said preheating chamber into said vaporization chamber, a compressor adapted to compress a vapor, means arranged for directing vapor from the interior of said vaporization chamber into said compressor for compression therein, heat exchange means arranged to maintain a fluid in out-of-contact and counterflow heat exchange relation with solution in said vaporization chamber with the fluid in said chamber flowing toward the normal liquid level of solution in said vaporization chamber, means arranged for directing vapor compressed by said compressor from said compressor into said heat exchange means in out-of-contact and counterflow heat exchange relation with solution in said vaporization chamber, heat transfer means arranged to maintain a liquid in out-of-contact and counterflow heat exchange relation with solution in said preheating chamber, and a draw-off line arranged for withdrawing concentrated solution from adjacent the normal liquid level of solution in said vaporization chamber and directing said withdrawn solution into said heat transfer means in out-of-contact and counterflow heat exchange relation with solution in said preheating chamber, said apparatus being substantially isolated from external sources of heat and cold.

15. Distillation apparatus which comprises in combination a chamber adapted to contain a solution, a compressor adapted to compress a vapor, means arranged for directing vapor from the interior of said chamber to said compressor for compression therein, conduit means arranged to maintain a fluid in out-of-contact heat exchange relation with solution in said chamber, means arranged for directing vapor compressed by said compressor from said compressor into said conduit means in out-of-contact heat exchange relation with solution in said chamber, container means adapted to contain a solution, means arranged for directing solution contained in said container means from said container means into said chamber, and second conduit means communicating with said first conduit means arranged for directing liquid, which results from condensation of vapor in said first conduit means, in out-of-contact heat exchange with solution in said container means, said second conduit means having approximately one-twelfth the cross-sectional flow capacity of the cross-sectional flow capacity of said first conduit means.

16. Distillation apparatus which comprises in combination means for containing a solution including a vaporization chamber and a preheating chamber, means arranged for directing a solution into said preheating chamber, means arranged for directing solution from said preheating chamber into said vaporization chamber, a compressor adapted to compress a vapor, means arranged for directing vapor from the interior of said vaporization chamber into said compressor for compression therein, first tortuous conduit means arranged within said vaporization chamber so as to substantially fill the cross-section of said chamber while leaving narrow interstices between the elements of the conduit means, means arranged for directing vapor compressed by said compressor from said compressor into and through said first tortuous conduit means in out-of-contact heat exchange relation with solution in said vaporization chamber, second tortuous conduit means within said preheating chamber arranged so as to substantially fill the cross-section of said preheating chamber, leaving narrow passages between the elements of said second conduit means which communicates with said first tortuous conduit means and which has substantially lesser cross-sectional flow capacity of said first conduit means and is arranged to direct liquid resulting from the condensation of vapor in said first tortuous conduit means in out-of-contact and counterflow heat exchange relation with solution in said preheating chamber, and a draw-off line arranged to draw off concentrated solution from said vaporization chamber and to direct said concentrated solution in out-of-contact and counterflow heat exchange relation with solution in said preheating chamber.

17. Distillation apparatus which comprises in combination a chamber adapted to contain a solution, a compressor adapted to compress a vapor, means arranged for directing vapor from the interior of said chamber to said compressor for compression therein, heat exchange means arranged to maintain a fluid in out-of-contact heat exchange relation with solution in said chamber, means arranged for directing vapor compressed by said compressor from said compressor into said heat exchange means in out-of-contact heat exchange relation with solution in said chamber, preheater means arranged for preheating a solution by counterflow heat exchange with condensate resulting from condensation of vapor in said heat exchange means, means for directing preheated solution from said preheater means into said vaporization chamber, and an overflow passage arranged to withdraw solution in said chamber above the level of the mouth of said passage and to direct withdrawn solution in out-of-contact counterflow heat exchange with solution in said vaporization chamber and in said preheater means, said mouth of said passage being located in said chamber above said heat exchange means.

18. Distillation apparatus which comprises in combination a chamber adapted to contain a solution, a compressor adapted to compress a vapor, means arranged for directing vapor from the interior of said chamber into said compressor for compression therein, heat exchange means arranged to maintain a fluid in out-of-contact heat exchange relation with solution in said chamber, means arranged for directing vapor compressed by said compressor from said compressor into said heat exchange means in out-of-contact heat exchange relation with solution in said chamber, preheating means including container means adapted to contain a solution, and means arranged for directing solution contained in said container means from said container means into said chamber, said preheating means including first and second heat transfer means arranged to maintain a liquid in out-of-contact and counterflow heat exchange relation with solution in said container means, means arranged for directing a liquid which results from condensation of vapor in said heat exchange means in out-of-contact heat exchange relation with solution in said chamber from said heat exchange means into said first heat transfer means in out-of-contact and counterflow heat exchange relation with solution in said container means, and a draw-off line arranged to withdraw vapor from the interior of said chamber and direct it into said second heat transfer means in out-of-contact and counterflow heat exchange with solution in said container means.

19. Apparatus according to claim 18 wherein said draw-off line is arranged to withdraw concentrated solution from the normal liquid level of solution in said chamber and direct it into said second heat transfer means in out-of-contact and counterflow heat exchange relation with solution in said container means.

20. Distillation apparatus which comprises an elongated shell, inlet means arranged for introducing a solution into said shell adjacent one end thereof, a vapor withdrawal line adjacent the other end of said shell arranged to withdraw vapor from the interior of said shell above the normal liquid level of solution in said shell, a compressor arranged to compress vapor withdrawn from said shell by said vapor withdrawal line, heat exchange means within a vaporization portion of said shell adjacent said vapor withdrawal line arranged to maintain a fluid in out-of-contact and counterflow heat exchange with solution in said vaporization portion of said shell, said heat exchange means including conduit means arranged in said shell so that solution about said conduit means is confined in spaces of such smallness as to inhibit circulation of solution in said vaporization portion as a whole of the shell, means for directing vapor compressed by said compressor from said compressor into said heat exchange means in out-of-contact and counterflow heat exchange with solution in said shell, heat transfer means in a preheater portion of said shell adjacent said inlet means arranged to maintain a fluid in out-of-contact and counterflow heat exchange with solution in said preheater portion of said shell, said heat transfer means including second conduit means which communicates with said first conduit means of said heat exchanger, which is arranged in said preheater portion of said shell so that solution about said second conduit means is confined in passages of such narrowness as to inhibit circulation of solution in said preheater portion as a whole of said shell, and which has substantially less cross sectional flow capacity than said first conduit means, and a draw-off line having its mouth adjacent the normal liquid level of solution in the vaporization portion of said shell and disposed within said preheater portion of said shell so that solution withdrawn through said draw-off line is brought into out-of-contact and counterflow heat exchange with solution in the preheater portion of said shell.

21. Distillation apparatus according to claim 20 which includes means for controlling the rate of flow of solution into said shell through said inlet means.

22. Distillation apparatus which comprises an elongated vertical shell, inlet means arranged for introducing a solution into said shell adjacent the lower end thereof, a vapor withdrawal line adjacent the upper end of said shell, a draw-off line disposed vertically within said shell having an open upper end so that solution introduced into said shell through said inlet means can overflow into said draw-off line and flow downwardly out of said shell, the position of said open upper end determining the normal liquid level of solution in said shell, a compressor arranged to compress vapor withdrawn from said shell by said vapor withdrawal line, heat exchange means disposed within said shell between said draw-off line and the wall of said shell below the normal liquid level of solution in said shell adapted to maintain a fluid in out-of-contact heat exchange with solution in said shell, means arranged for directing vapor compressed by said compressor into said heat exchange means in out-of-contact heat exchange relation with solution in said shell, heat transfer means disposed within said shell between said draw-off line and said shell and between said heat exchange means and said inlet means adapted to maintain a fluid in out-of-contact and counterflow heat exchange with solution flowing upwardly in said shell, and means arranged to direct condensate resulting from condensation of compressed vapor in said heat exchange means into said heat transfer means in out-of-contact and counterflow heat exchange with solution in said shell.

ROBERT V. KLEINSCHMIDT.